(12) United States Patent
Kim et al.

(10) Patent No.: US 12,554,179 B2
(45) Date of Patent: Feb. 17, 2026

(54) APERTURE MODULE AND CAMERA MODULE INCLUDING THE SAME

(71) Applicant: SAMSUNG ELECTRO-MECHANICS CO., LTD., Suwon-si (KR)

(72) Inventors: Ju Ho Kim, Suwon-si (KR); Sanghyun Ji, Suwon-si (KR); Dooseub Shin, Suwon-si (KR); Donghoon Lee, Suwon-si (KR); Dohwan Kim, Suwon-si (KR); Jongeun Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 542 days.

(21) Appl. No.: 18/112,798

(22) Filed: Feb. 22, 2023

(65) Prior Publication Data

US 2024/0085760 A1 Mar. 14, 2024

(30) Foreign Application Priority Data

Sep. 13, 2022 (KR) .......................... 10-2022-0115144

(51) Int. Cl.
G03B 9/06 (2021.01)
(52) U.S. Cl.
CPC ..................................... *G03B 9/06* (2013.01)
(58) Field of Classification Search
None
See application file for complete search history.

(56) References Cited

U.S. PATENT DOCUMENTS

| 5,159,382 A | 10/1992 | Lee et al. |
| 2007/0098399 A1 | 5/2007 | Yasunaga |
| (Continued) | | |

FOREIGN PATENT DOCUMENTS

| JP | 2007-54419 A | 3/2007 |
| JP | 4971257 B2 | 7/2012 |
| (Continued) | | |

OTHER PUBLICATIONS

Korean Office Action issued on Oct. 2, 2024, in counterpart Korean Patent Application No. 10-2022-0115144 (8 pages in English, 6 pages in Korean).

(Continued)

*Primary Examiner* — Stephanie E Bloss
*Assistant Examiner* — Diana Hancock
(74) *Attorney, Agent, or Firm* — NSIP Law

(57) ABSTRACT

An aperture module includes a reference plate, including a protruded pivot pin; a first-stage blade unit including a pair of first blades forming a first-diameter aperture having a diameter smaller than that of the central opening when pivoted about the pivot pin; a second-stage blade unit including a pair of second blades, wherein the second-stage blade unit is disposed on a second planar surface different from a first planar surface of the first-stage blade unit, and the pair of second blades forms a second-diameter aperture having a diameter smaller than the diameter of the first-diameter aperture when pivoted about the pivot pin; and an aperture driver including a driving pin configured to insert into the guide slot, the first blade slot, and the second blade slot, and move along the guide slot. A curvature of the first blade slot and a curvature of the second blade slot form different angles.

23 Claims, 24 Drawing Sheets

(56) References Cited

U.S. PATENT DOCUMENTS

| | | | | |
|---|---|---|---|---|
| 2009/0232491 | A1* | 9/2009 | Masuda | G03B 9/06 |
| | | | | 396/510 |
| 2010/0157405 | A1 | 6/2010 | Numnual et al. | |
| 2018/0003915 | A1 | 1/2018 | Shin et al. | |
| 2020/0068100 | A1 | 2/2020 | Kim | |
| 2020/0077000 | A1 | 3/2020 | Lee et al. | |
| 2020/0241387 | A1 | 7/2020 | Seo et al. | |
| 2020/0264495 | A1* | 8/2020 | Zhuo | G03B 17/566 |
| 2020/0401014 | A1* | 12/2020 | Seo | G03B 9/06 |

FOREIGN PATENT DOCUMENTS

| | | | | |
|---|---|---|---|---|
| JP | 4994639 B2 | 8/2012 | | |
| KR | 10-2010-0138269 A | 12/2010 | | |
| KR | 10-2011-0025546 A | 3/2011 | | |
| KR | 20120133910 A | * 12/2012 | | H04N 23/55 |
| KR | 10-2018-0003935 A | 1/2018 | | |
| KR | 10-2018-0092206 A | 8/2018 | | |
| KR | 10-2020-0022303 A | 3/2020 | | |
| KR | 10-2020-0024495 A | 3/2020 | | |
| KR | 10-2020-0093997 A | 8/2020 | | |

OTHER PUBLICATIONS

Korean Notice of Allowance issued on May 21, 2025, in corresponding Korean Patent Application No. 10-2022-0115144. (2pages in English, 3pages in Korean).

* cited by examiner

APERTURE MODULE AND CAMERA MODULE INCLUDING THE SAME

CROSS-REFERENCE TO RELATED APPLICATION

This application claims the benefit under 35 USC 119(a) of Korean Patent Application No. 10-2022-0115144 filed in the Korean Intellectual Property Office on Sep. 13, 2022, the entire disclosure of which is incorporated herein by reference for all purposes.

BACKGROUND

1. Field

The present disclosure relates to an aperture module and a camera module including the same.

2. Description of the Related Art

Cameras are adopted in portable electronic devices such as smartphones, tablet PCs, and laptops. As competition for product differentiation of portable electronic device intensifies, the desire to apply general digital camera functions to portable electronic device cameras increases. Among them, the demand for a bokeh effect or a bright and clear picture by controlling the amount of light passing through a variable aperture has also increased.

A general digital camera has a mechanical aperture and is driven to change the amount of light incident according to a shooting environment. However, in the case of a camera module applied to a small device such as a portable electronic device, it may be difficult to apply such a mechanical aperture due to structural characteristics and space limitations.

The mechanical aperture applied to a general digital camera may have a drawback: the number of parts may be large, the plurality of rotation types of blades may have a circular aperture structure and increase the thickness. Therefore, developing an aperture advantageous for downsizing and thinness may be desirable, which may be advantageous for portable electronic device applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an aperture module includes a reference plate, including a protruded pivot pin, wherein the reference plate includes a central opening and a guide slot penetrating through one corner region; a first-stage blade unit including a pair of first blades each including a first blade slot overlapping a portion of the guide slot, wherein the pair of first blades forms a first-diameter aperture having a diameter smaller than a diameter of the central opening when pivoted about the pivot pin; a second-stage blade unit including a pair of second blades each including a second blade slot overlapping a portion of the guide slot, wherein the second-stage blade unit is disposed on a second planar surface different from a first planar surface of the first-stage blade unit, and the pair of second blades forms a second-diameter aperture having a diameter smaller than the diameter of the first-diameter aperture when pivoted about the pivot pin; and an aperture driver including a driving pin configured to insert into the guide slot, the first blade slot, and the second blade slot, and move along the guide slot. A curvature of the first blade slot and a curvature of the second blade slot form different angles.

Each of the guide slot, the first blade slot, and the second blade slot may have a front tip closest to the pivot pin and an end tip furthest from the pivot pin. The guide slot may extend linearly from the front tip to the end tip, and a center line passing through a center of a width direction of the guide slot may pass through a center of the pivot pin.

A pair of first blade slots in the pair of first blades may be linearly symmetrical with respect to the guide slot, and a pair of second blade slots in the pair of second blades may be linearly symmetrical to each other with respect to the guide slot.

The first blade slot may include a first section including the front tip and a second section including the end tip, and the second section forms a first angle with the first section. A center line passing through a center of a width direction of the first section of the first blade slot may extend away from the center of the pivot pin, and a center line passing through a center of a width direction of the second section of the first blade slot may pass through the center of the pivot pin.

When the driving pin passes the first section of the first blade slot, the pair of first blades may be configured to rotate about the pivot pin.

The second blade slot may include a first section including the front tip and a second section including the end tip, and the second section may form an angle with the first section. A center line passing through a center of a width direction of the first section of the second blade slot may pass through the center of the pivot pin, and a center line passing through a center of a width direction of the second section of the second blade slot may extend away from the center of the pivot pin.

When the driving pin passes the second section of the second blade slot, the pair of second blades may be configured to rotate about the pivot pin.

The pair of first blades may include a pair of first driving sections, respectively, configured to overlap when varying an overlapped region based on a movement of the driving pin, and a pair of first shield sections that extend semi-annularly from the pair of first driving sections to form the first-diameter aperture. The pair of second blades may include a pair of second driving sections, respectively, configured to overlap when varying an overlapped region based on the movement of the driving pin, and a pair of second shield sections that extend semi-annularly from the pair of second driving sections to form the second-diameter aperture.

The aperture module may further include a third-stage blade unit including a pair of third blades each including a third blade slot overlapping a portion of the guide slot. The third-stage blade unit may be disposed on a third planar surface different from the first and second planar surfaces, and the pair of third blades may form a third-diameter aperture having a diameter smaller than the diameter of the second-diameter aperture when pivoted about the pivot pin. A curvature of the third blade slot may be different that the curvature of the first blade slot and the curvature of the second blade slot.

When each of the first blade slot, the second blade slot, and the third blade slot is divided into a plurality of sections in a longitudinal direction, center lines passing through centers of width directions of the first blade slot, the second blade slot, and the third blade slot may respectively extend out of the center of the pivot pin in different sections.

The reference plate may further include a base plate on which the first-stage blade unit and the second-stage blade unit are seated, and the guide slot may include a base guide slot penetrating through one corner region of the base plate.

The reference plate may further include a cover plate disposed to cover the first-stage blade unit and the second-stage blade unit, and the guide slot may include a cover guide slot penetrating through one corner region of the cover plate.

The aperture driver may include a moving member configured to linearly reciprocate to move the driving pin, and the moving member may include an aperture driving magnet configured to face an aperture driving coil. The guide slot of the reference plate may extend in a direction parallel to one edge of the reference plate.

The aperture driver may further include a shape memory alloy (SMA) wire having one end connected to the driving pin to move the driving pin based on electrical signal input.

The reference plate may further include a cover plate disposed to cover the first-stage blade unit and the second-stage blade unit, the guide slot may include a cover guide slot penetrating through one corner region of the cover plate, and the cover guide slot may extend linearly from the one corner region to a center of the central opening in a diagonal direction.

The aperture driver may further include a restoration spring configured to support the driving pin and apply a repulsive force outward in a radial direction of the central opening.

In another general aspect, a camera module includes a housing having an inner space; a lens driving module accommodated in the inner space of the housing and driven in an optical axis direction or a direction perpendicular to the optical axis direction; and an aperture module, disposed above the lens driving module, configured to adjust a size of an incidence hole. The aperture module includes a reference plate, comprising a protruded pivot pin, wherein the reference plate includes a central opening and a guide slot penetrating through one corner region; a first-stage blade unit comprising a pair of first blades each including a first blade slot overlapping a portion of the guide slot, wherein the pair of first blades forms a first-diameter aperture having a diameter smaller than a diameter of the central opening when pivoted about the pivot pin; a second-stage blade unit comprising a pair of second blades each including a second blade slot overlapping a portion of the guide slot, wherein the second-stage blade unit is disposed on a second planar surface different from a first planar surface of the first-stage blade unit, and the pair of second blades forms a second-diameter aperture having a diameter smaller than the diameter of the first-diameter aperture when pivoted about the pivot pin; and an aperture driver comprising a driving pin configured to insert into the guide slot, the first blade slot, and the second blade slot, and move along the guide slot. A curvature of the first blade slot and a curvature of the second blade slot form different angles.

The aperture driver may further include a moving member configured to linearly reciprocate to move the driving pin, and the moving member may include an aperture driving magnet configured to face an aperture driving coil.

The aperture driving coil may be fixed to one side wall of the housing.

In another general aspect, an aperture module includes a base plate, including a protruded pivot pin, an aperture, and a linear guide slot; a first-stage blade unit including a pair of first blades each including a first blade slot overlapping a portion of the guide slot, wherein the pair of first blades forms a first-diameter aperture having a diameter different than a diameter of the aperture when pivoted about the pivot pin; a second-stage blade unit including a pair of second blades each including a second blade slot overlapping a portion of the guide slot, wherein the second-stage blade unit is disposed on the first-stage blade unit, and the pair of second blades forms a second-diameter aperture having a diameter different than the diameter of the first-diameter aperture when pivoted about the pivot pin; and an aperture driver including a driving pin configured to insert into the guide slot, the first blade slot, and the second blade slot, and move along the guide slot. A curvature of the first blade slot and a curvature of the second blade slot are axisymmetric with respect to the linear guide slot.

The aperture driver may include a moving member configured to linearly reciprocate to move the driving pin.

The aperture driver may further include a shape memory alloy (SMA) wire having one end connected to the driving pin to move the driving pin based on electrical signal input.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
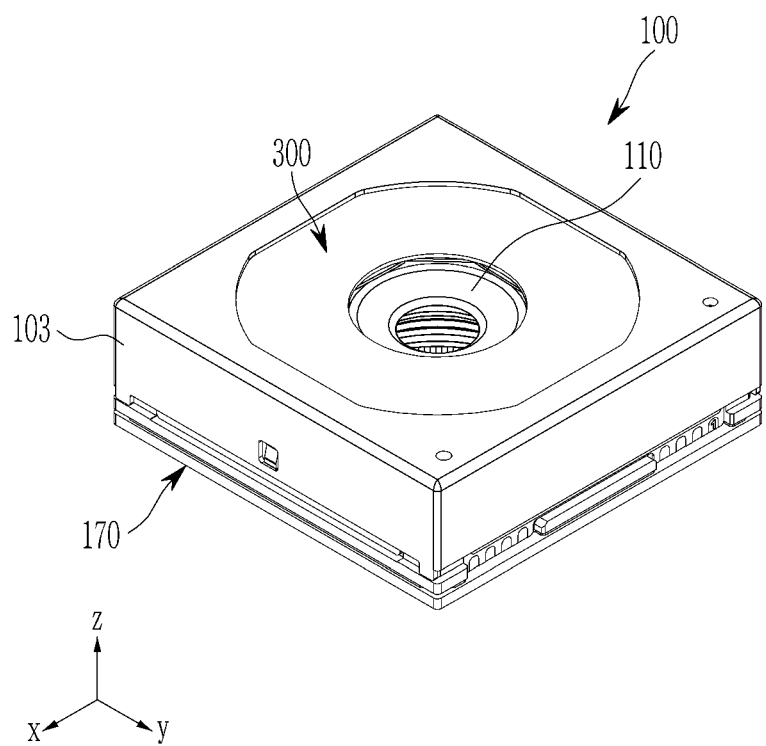
FIG. 1 is a perspective view of an external view of a camera module according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Further, throughout the specification, the phrase "on a plane" means viewing a target portion from the top, and the phrase "on a cross-section" means viewing a cross-section formed by vertically cutting a target portion from the side.

Throughout the specification, when it is described that a part is "coupled" with another part, it includes not only a case of "directly or physically coupled" but also a case of "indirectly or non-coupled" with another element in between.

Figure 2:
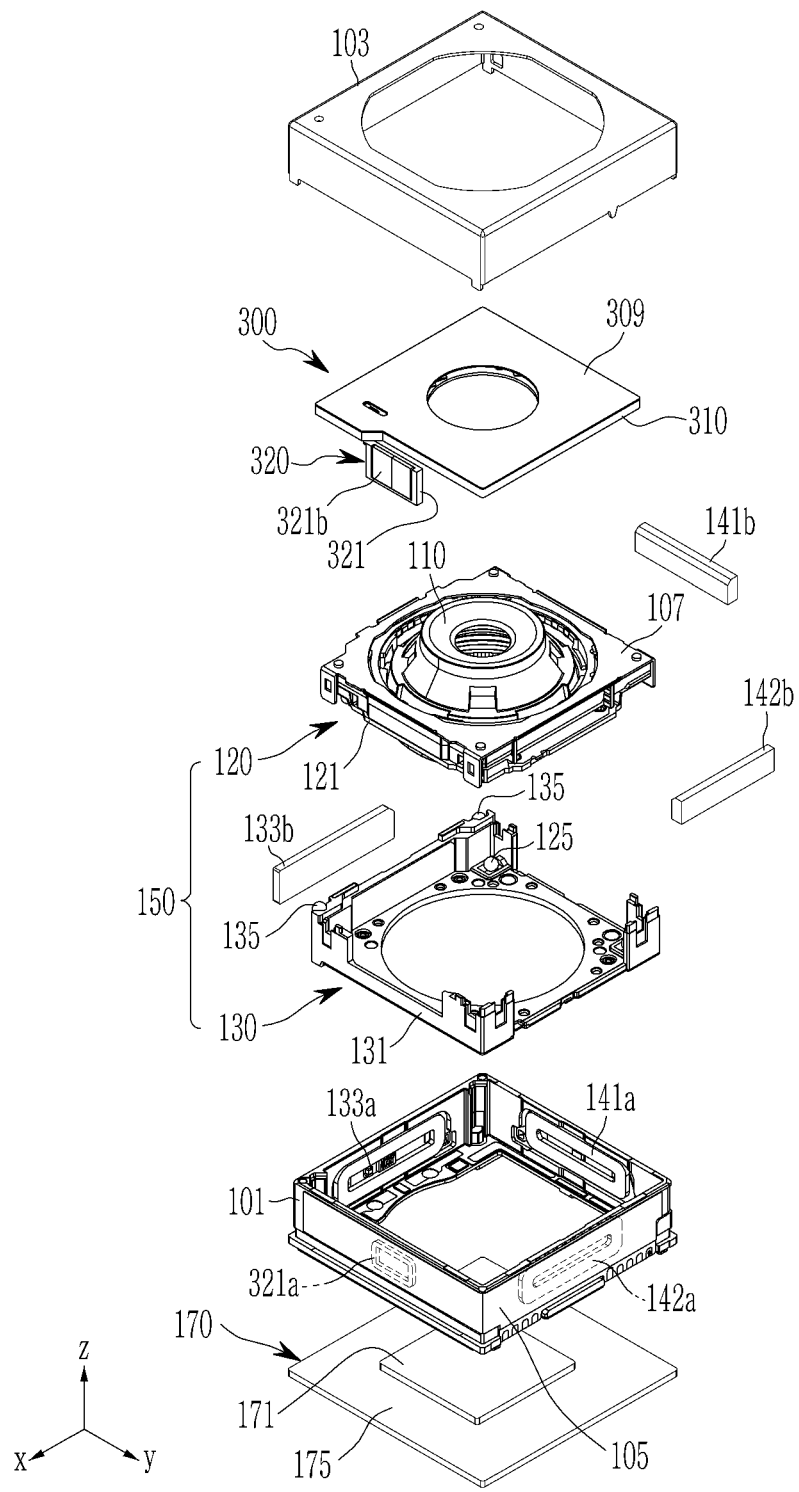
FIG. 2 is an exploded perspective view illustrating the camera module shown in FIG. 1.

FIG. 1 is a perspective view of an external view of a camera module according to one or more embodiments, and FIG. 2 is an exploded perspective view illustrating the camera module shown in FIG. 1.

Referring to FIG. 1 and FIG. 2, a camera module 100, according to the present embodiment, includes a lens barrel 110, a lens driving module 150 that may move the lens barrel 110, an aperture module 300 that may adjust the size of an incidence hole, and an image sensor unit 170 that may convert incident light into an electrical signal. The lens barrel 110 and the lens driving module 150 are housed in a housing 101 together with the aperture module 300, and the housing 101 is covered with a cover 103.

The lens barrel 110 may have a hollow cylinder shape such that a plurality of lenses for imaging a subject can be accommodated therein, and a plurality of lenses are mounted on the lens barrel 110 along an optical axis. A plurality of lenses are disposed as many as desired according to the design of the lens barrel 110, and each lens may have optical characteristics such as the same or different refractive index.

The lens driving module 150 may be a device that mounts and moves the lens barrel 110, and may include an auto focus (AF) unit 130 that adjusts focus and an optical image stabilization (OIS) unit 120 that corrects hand shake or shake. For example, the lens driving module 150 may adjust the focus or implement a zoom function by moving the lens barrel 110 in the optical axis direction (the z-axis direction of the drawing) using the AF unit 130, and moving the lens barrel 110 in the direction perpendicular to the optical axis direction (x-axis or y-axis direction) using the OIS unit 120 such that the hand shake or shake during shooting can be corrected.

The AF unit 130 includes an AF carrier 131 accommodating the lens barrel 110, and an AF driver that generates a driving force to move the lens barrel 110 and the AF carrier 131 in the optical axis direction. The AF driver may include an AF driving magnet 133*b* and an AF driving coil 133*a*. The AF driving magnet 133*b* may be mounted on one surface of the AF carrier 131, and the AF driving coil 133*a* may be mounted on the housing 101 via a circuit board 105. When the AF carrier 131 is moved, a ball-shaped rolling member 135 can be disposed between them to reduce friction between the AF carrier 131 and the housing 101.

The OIS unit 120 may include an OIS carrier 121 that guides the movement of the lens barrel 110 and an OIS driver that generates a driving force that moves the OIS carrier 121 in a direction that is perpendicular to the optical axis direction.

The OIS carrier 121 is accommodated in the AF carrier 131, aligned along the optical axis direction, and serves to guide the movement of the lens barrel 110. The OIS carrier 121 may have a central opening into which the lens barrel 110 can be inserted, and the lens barrel 110 is coupled and fixed to the OIS carrier 121 through the central opening.

The OIS driver includes a first OIS driver, including a first OIS driving coil 141*a* and a first OIS driving magnet 141*b*, and a second OIS driver, including a second OIS driving coil 142*a* and a second OIS driving magnet 142*b*. The first and second OIS driving magnets 141*b* and 142*b* are mounted on the OIS carrier 121, and the first and second OIS driving coils 141*a* and 142*a* facing the first and second OIS driving magnets 141*b* and 142*b*, respectively, can be fixedly mounted to the housing 101 through the circuit board 105.

The first OIS driver generates a driving force in the first direction (x-axis direction) that is perpendicular to the optical axis direction, and the second OIS driver generates a driving force in the second direction (y-axis direction) that is perpendicular to the optical axis and the first direction. A plurality of ball members 125 in the form of balls may be provided between the AF carrier 131 and the OIS carrier 121 to facilitate movement between the components of the OIS unit 120.

The image sensor unit 170 is a device that may convert light incident through the lens barrel 110 into an electrical signal. For example, the image sensor unit 170 may include an image sensor 171 and a printed circuit board 175 connected thereto, and may further include an infrared filter. The infrared filter blocks light in an infrared region among light incident through the lens barrel 110.

Referring to FIG. 2, the aperture module 300 applied to the camera module 100, according to the present embodiment, may be disposed at the top of the lens driving module 150, and may be positioned in front of the lens driving module 150 with the light incident direction as a reference. The aperture module 300 may be configured to move in the optical axis direction, the first direction, and the second direction together with the lens driving module 150 in combination with the lens driving module 150. The aperture module 300 is configured to vary the amount of light incident on the lens driving module 150.

The aperture module 300 includes an aperture driver 320 that extends from one edge toward the bottom of the housing 101 and is accommodated in a space inside the housing 101. The aperture driver 320 includes an aperture driving coil 321*a* mounted on the housing 101 via the circuit board 105 and an aperture driving magnet 321*b* disposed to face the driving coil 321*a*. The aperture driving magnet 321*b* is mounted on a moving member 321 and reciprocates in a straight line.

When power is applied to the aperture driving coil 321*a*, the moving member 321 accommodating the aperture driving magnet 321*b* may reciprocate in a straight-line direction perpendicular to the optical axis direction due to the electromagnetic force between the aperture driving magnet 321*b* and the aperture driving coil 321*a*. The moving member 321 is coupled with the blades 351, 352, 361, and 362 (refer to FIG. 3) on the base plate 310 to provide a driving force, and thus the straight-line reciprocating motion of the moving member 321 is converted to pivot motion of the blades 351, 352, 361, and 362, thereby adjusting the size of the incident hole of the aperture module 300.

Figure 3:
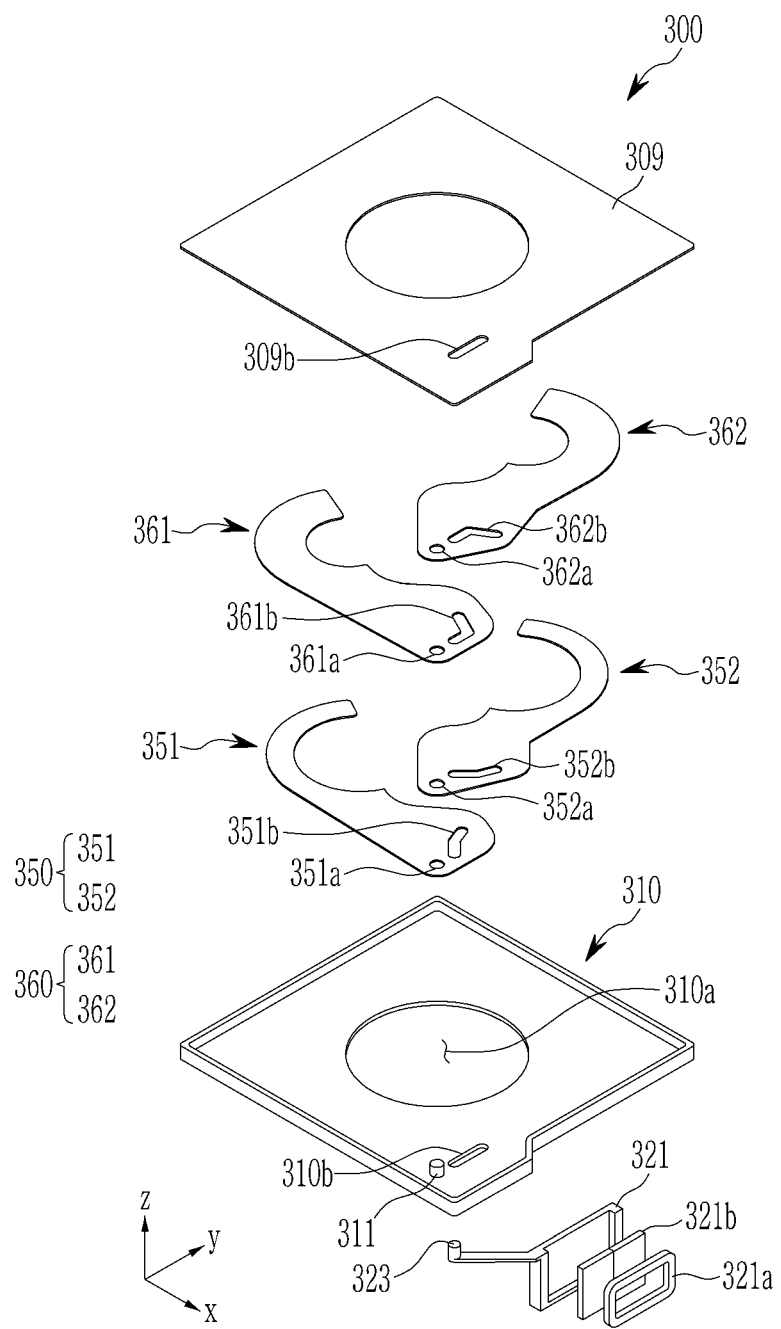
FIG. 3 is an exploded perspective view of the aperture module shown in FIG. 2.
Figure 4:
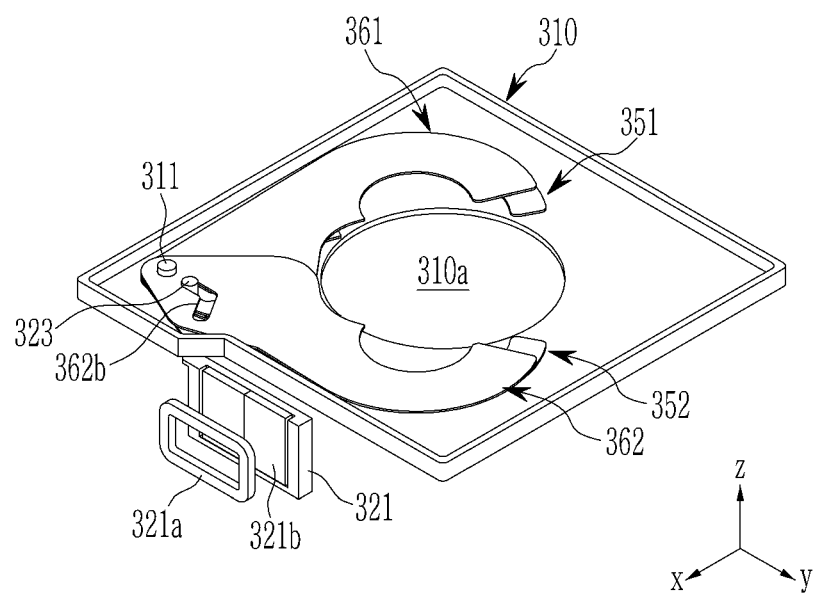
FIG. 4 is a perspective view of the aperture module shown in FIG. 3, excluding the cover plate.

FIG. 3 is an exploded perspective view of the aperture module shown in FIG. 2, and FIG. 4 is a perspective view of the aperture module shown in FIG. 3, excluding the cover plate.

Referring to FIG. 3, the aperture module 300, according to the present embodiment, may be configured by sequentially stacking a first-stage blade unit 350 and a second-stage blade unit 360 on a base plate 310 in the optical axis direction. The first-stage blade unit 350 includes a pair of first blades 351 and 352, and the second-stage blade unit 360 includes a pair of second blades 361 and 362.

The base plate 310 has a central opening 310*a* and includes a pivot pin 311 protruding in the optical axis direction in one corner region, and the pair of first blades 351 and 352 and the pair of second blades 361 and 362 may be coupled to the pivot pin 311. The first blades 351 and 352, and the second blades 361 and 362 may have pivot pin holes 351*a*, 352*a*, 361*a*, and 362*a*, respectively, sleeved over the pivot pin 311.

The aperture module 300 may include an aperture driver 320 disposed at one edge of the base plate 310. The aperture driver 320 may include a moving member 321 reciprocating in a straight line parallel to one edge of the base plate 310, and the aperture driving magnet 321*b* may be mounted on the moving member 321. The aperture driving coil 321*a* may be disposed to face the aperture driving magnet 321*b* at a predetermined interval.

The aperture driver 320 may include an upwardly protruded drive pin 323 at the end of an arm extending from the top of the moving member 321. The base plate 310 includes a base guide slot 310*b* in a corner region where a pivot pin 311 is formed, and a driving pin 323 may penetrate the base guide slot 310*b* in the optical axis direction and protrude upward. Accordingly, the driving pin 323 of the aperture driver 320 may be guided and moved along a path formed by the base guide slot 310*b*. The base plate 310 may be a reference plate for the present embodiment.

The base plate 310 may have an approximately square or rectangular planar shape, and a planar step portion may be formed at one edge where the aperture driver 320 is disposed. Therefore, when viewed in a plan view, the edge formed with the stepped portion partially retreats in a central direction such that the moving member 321 of the aperture driver 320 may be exposed upward.

The base plate 310 is formed by being depressed in the optical axis direction in all regions except for rims along the edge, and the cover plate 309 is coupled to the top of the base plate 310 to cover the cover plate 309, thereby protecting the components of the aperture module 300. A recessed depth of the base plate 310 may be equal to or at least greater than the entire thickness of the first-stage blade unit 350 and the second-stage blade unit 360 when stacked therein.

Figure 5:
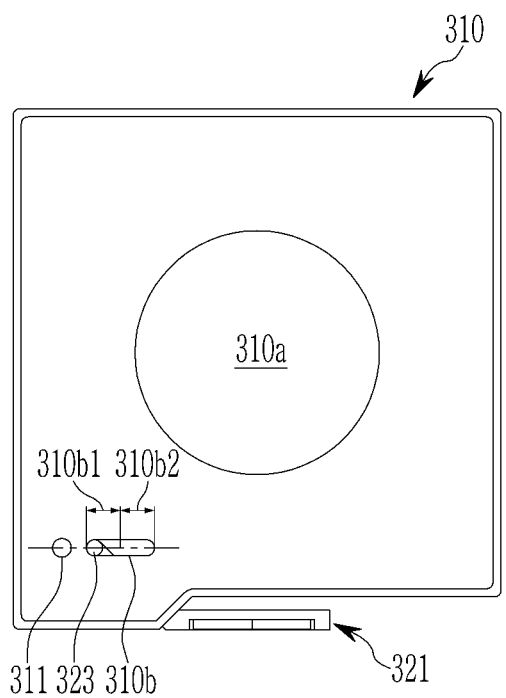
FIG. 5 is a top plan view of the base plate and the aperture driver of the aperture module shown in FIG. 2.
Figure 6:
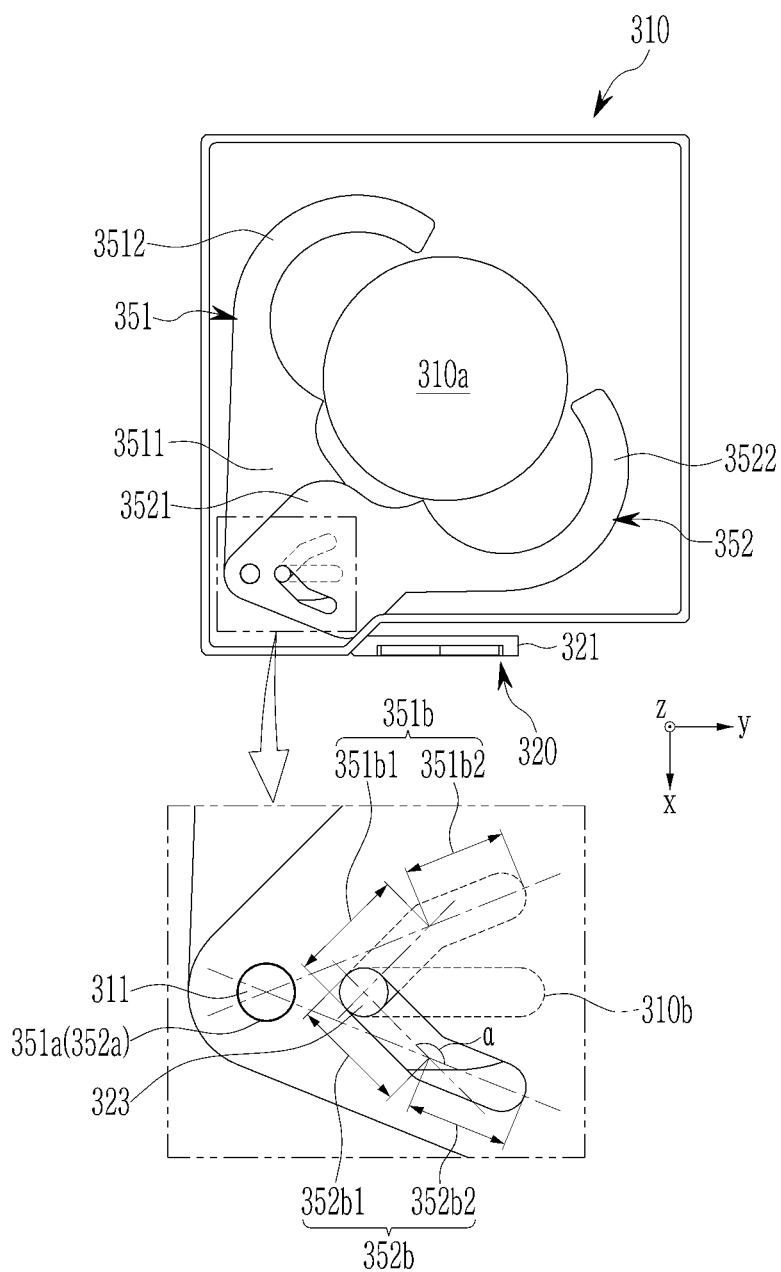
FIG. 6 is a top-plan view of a state in which the first-stage blade unit is assembled on the base plate of the aperture module shown in FIG. 2.
Figure 7:
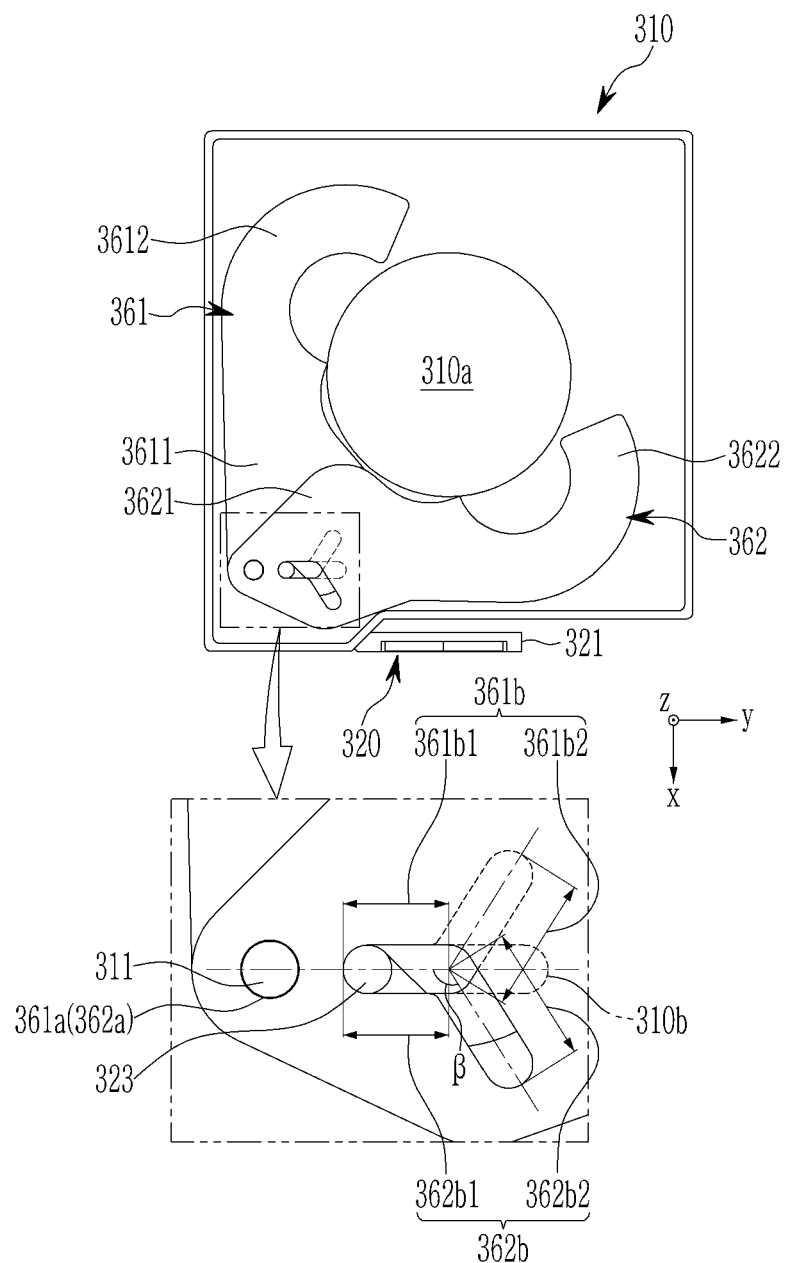
FIG. 7 is a top-plan view of a state in which the second-stage blade unit is assembled on the base plate of the aperture module shown in FIG. 2.

FIG. 5 is a top-plan view of the base plate and the aperture driver of the aperture module shown in FIG. 2. FIG. 6 is a top-plan view of a state in which the first-stage blade unit is assembled on the base plate of the aperture module shown in FIG. 2. FIG. 7 is a top-plan view of a state in which the second-stage blade unit is assembled on the base plate of the aperture module shown in FIG. 2.

Referring to FIG. 5, the base plate 310 of the aperture module 300, according to the present embodiment, has the central opening 310a, and includes the pivot pin 311 and the base guide slot 310b in one corner region positioned on one side in the diagonal direction therefrom. The base guide slot 310b is spaced apart from the pivot pin 311 and may be extended in a straight line along one direction to have a front tip closest to the pivot pin 311 and an end tip furthest from the pivot pin 311. In this case, the center line passing through the center of the width direction of the base guide slot 310b may be configured to pass through the center of the pivot pin 311.

In the present embodiment, the base guide slot 310b may extend in a direction parallel to one edge of the base plate 310, and may be divided into a first section 310b1, including the front tip and a second section 310b2, including the end tip. The first section 310b1 and the second section 310b2 of the base guide slot 310b are formed by aligning respective center lines with each other, and thus may not be bent.

Referring to FIG. 6, a pair of first blades 351 and 352 may be seated on the base plate 310 while the pivot pin 311 is inserted into the pivot pin holes 351a and 352a. The pair of first blades 351 and 352 include a lower first blade 351 and an upper first blade 352, and the upper first blade 352 may be disposed on the lower first blade 351.

The pair of first blades 351 and 352 may include a pair of first driving sections 3511 and 3521 that overlap each other as the overlapping region changes according to the movement of the driving pin 323, and a pair of first shield sections 3512 and 3522 extending in a semi-annular shape therefrom, respectively. The pair of first shield sections 3512 and 3522 may be rotated around the pivot pin 311 as the driving pin 323 moves, and the central opening 310a of the base plate 310 is partially shielded from the edge to form a first-diameter aperture 350a. Therefore, the first-diameter aperture 350a has a smaller diameter than the central opening 310a.

The pair of first drive sections 3511 and 3521 may include pivot pin holes 351a and 352a and first blade slots 351b and 352b, respectively. In the pair of first drive sections 3511 and 3521, the pivot pin holes 351a and 352a overlap each other, and the pair of first blade slots 351b and 352b may be linearly symmetrical with respect to the base guide slot 310b.

The pair of first shield sections 3512 and 3522 may be formed with concave inner edges forming the first-diameter aperture 350a facing each other. In addition, when the pair of first blades 351 and 352 are in a fully open state, distal ends of the first shield sections 3512 and 3522 may be formed to be positioned outside the central opening 310a of the base plate 310.

The first blade slots 351b and 352b are spaced apart from the pivot pin 311 and have a front tip closest to the pivot pin 311 and an end tip furthest from the pivot pin 311, and may be bent to form a curvature and extended at a first angle α. That is, the first blade slots 351b and 352b include first sections 351b1 and 352b1, including the front tip and second sections 351b2 and 352b2, including the end tip, and the first sections 351b1 and 352b1 and the second sections 351b2 and 352b2 may be bent, forming a curvature, to form the first angle α.

In this case, a center line passing through a center of a width direction of the first sections 351b1 and 352b1 of the first blade slots 351b and 352b passes away from the center of the pivot pin 311, and a center line passing through a center of a width direction of the second sections 351b2 and 352b2 passes through the center pin 311. In addition, when the pair of first blades 351 and 352 are fully opened, the first blade slots 351b and 352b and the base guide slot 310b are disposed such that the respective centerlines of the first blade slots 351b and 352b and the base guide slot 310b are not aligned with each other.

Referring to FIG. 7, the pair of second blades 361 and 362 may be seated on the base plate 310 while the pivot pin 311 is inserted into the pivot pin holes 361a and 362a. The pair of second blades 361 and 362 may include a lower second blade 361 and an upper second blade 362, and the upper second blade 362 may be disposed on the lower second blade 361.

The pair of second blades 361 and 362 may include a pair of second driving sections 3611 and 3621 that overlap each other as the overlapping region changes according to the movement of the driving pin 323, and a pair of second shield sections 3612 and 3622 extending in a semi-annular shape therefrom, respectively. The pair of second shield sections 3612 and 3622 may be rotated around the pivot pin 311 as the driving pin 323 moves, and the first-diameter aperture 350a is partially shielded from the edge to form a second-diameter aperture 360a. Therefore, the second-diameter aperture 360a has a smaller diameter than the first-diameter aperture 350a.

The pair of second drive sections 3611 and 3621 may include pivot pin holes 361a and 362a and second blade slots 361b and 362b, respectively. In the pair of second drive sections 3611 and 3621, the pivot pin holes 361a and 362a overlap each other, and the pair of second blade slots 361b and 362b may be linearly symmetrical with respect to the base guide slot 310b.

The pair of second shield sections 3612 and 3622 may be formed with concave inner edges forming the second-diameter aperture 350a facing each other. In addition, when the pair of second blades 361 and 362 are in a fully open state, distal ends of the second shield sections 3612 and 3622 may be formed to be positioned outside the central opening 310a of the base plate 310.

The second blade slots 361b and 362b are spaced apart from the pivot pin 311 and have a front tip closest to the pivot pin 311 and an end tip furthest from the pivot pin 311, and may be bent to form a curvature and extended at a second angle R. That is, the second blade slots 361b and 362b include first sections 361b1 and 362b1, including the front tip and the second sections 361b2 and 362b2, including the end tip. The first sections 361b1 and 362b1 and the second sections 361b2 and 362b2 may be bent, forming a curvature, to form the second angle β. In this case, the second angle β may be formed smaller than the first angle α of the first blade slots 351b and 352b.

In this case, a center line passing through a center of a width direction of the first sections 361b1 and 362b1 of the second blade slots 361b and 362b passes away from the center of the pivot pin 311. A center line passing through a center of a width direction of the second sections 361b2 and 362b2 passes through the center pin 311. In addition, when the pair of second blades 361 and 362 are fully opened, the second blade slots 361b and 362b and the first blade slots 351*b* and 352*b* are disposed such that the respective centerlines of the second blade slots 361*b* and 362*b* and the first blade slots 351*b* and 352*b* are not aligned with each other.

Figure 8:
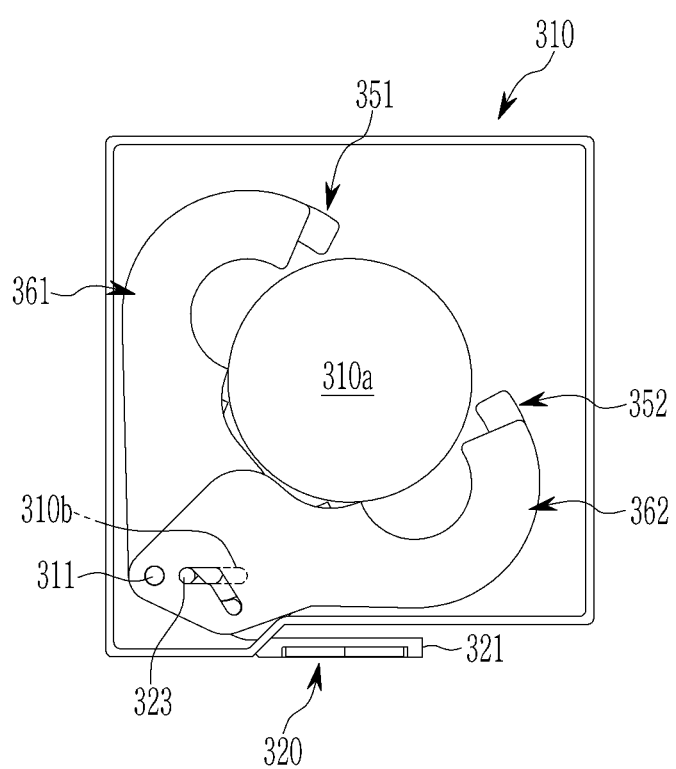
FIG. 8 to FIG. 10 are top plan views that sequentially illustrate a driving process of the aperture module shown in FIG. 2.
Figure 9:
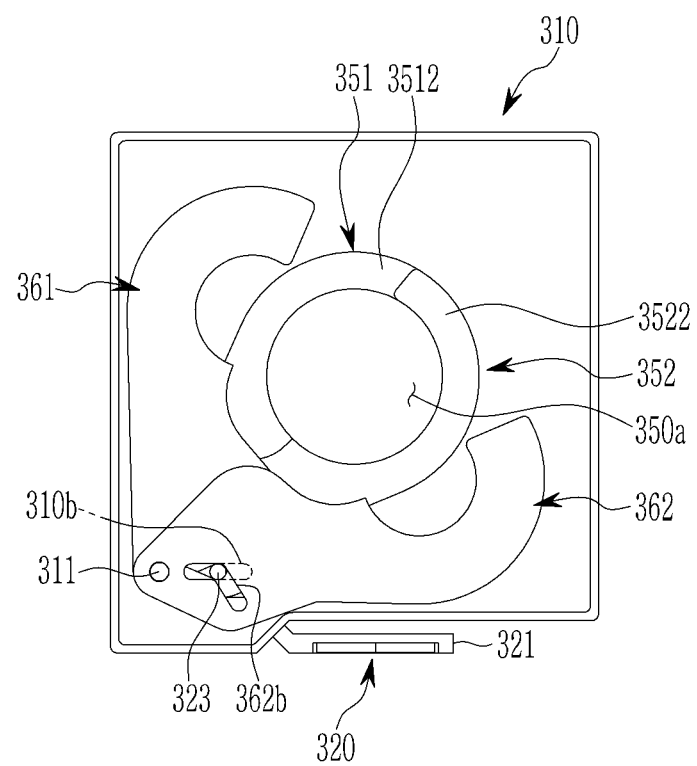
Figure 10:
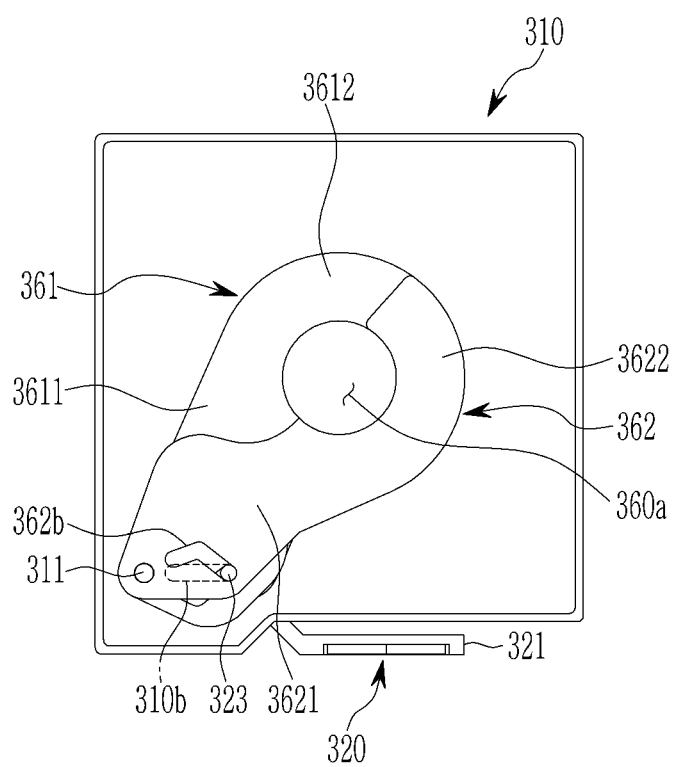

FIG. 8 to FIG. 10 are top plan views that sequentially illustrate a driving process of the aperture module shown in FIG. 2. FIG. 8 shows that the aperture module 300 is in a large aperture state. FIG. 9 shows that the aperture module 300 is in a middle aperture state. FIG. 10 shows a state of the first-stage blade unit 350 and the second-stage blade unit 360 in a smaller-diameter aperture state.

Referring to FIG. 8, in the initial state of the aperture module 300, that is, when an incidence hole is fully opened, the driving pin 323 is to be positioned at the front tip of the first blade slot (351*b*, 352*b*; see FIG. 6) of the first blades 351 and 352 and the front tip of the second blade slots 361*b* and 362*b* (refer to FIG. 7) of the second blades 361 and 362. The moving member 321 of the aperture driver 320 connected to the driving pin 323 may also be disposed to its initial position.

In this case, the pair of first blades 351 and 352 and the pair of second blades 361 and 362 may be disposed such that there is no overlapping portion with the central opening 310*a* by spreading to both sides of the central opening 310*a*. Accordingly, the aperture module 300 may form a large-diameter aperture with an incidence hole as large as the central opening 310*a* in size.

Referring to FIG. 9, the driving pin 323 may move through each first section along the base guide slot 310*b*, the first blade slots 351*b* and 352*b* (refer to FIG. 6), and the second blade slots 361*b* and 362*b* (refer to FIG. 7). The movement of the driving pin 323 may be driven as the moving member 321 of the aperture driver 320 moves.

In the initial state (large-diameter aperture state), the first section 310*b*1 of the base guide slot 310*b* and the first sections 351*b*1 and 352*b*1 of the first blade slots 351*b* and 352*b* are not aligned. Therefore, when the driving pin 323 starts to move, the pair of first blades 351 and 352 also start to rotate. On the other hand, in the initial state, the first sections 310*b*1 of the base guide slot 310*b* and the first sections 361*b*1 and 362*b*1 of the second blade slots 361*b* and 362*b* are aligned. Accordingly, although the driving pin 323 moves in the first sections 361*b*1 and 362*b*1 of the second blade slots 361*b* and 362*b* formed in the second blades 361 and 362, the pair of second blades 361 and 362 may not be driven and may maintain their initial position.

When the driving pin 323 moves in the first sections 351*b*1 and 352*b*1 of the first blade slot 351*b* and 352*b*, the pair of first blades 351 and 352 may be rotated to approach each other around the pivot pin 311. Thus, the pair of first driving sections 3511 and 3521 may overlap each other in a larger region, and the pair of first shield sections 3512 and 3522 may meet each other to form the first-diameter aperture 350*a*. The first-diameter aperture 350*a* is formed of a circular opening, and the aperture module 300 may form a medium-diameter aperture with a smaller diameter than the central opening 310*a*.

Referring to FIG. 10, the driving pin 323 may move in each second section along the base guide slot 310*b*, the first blade slots 351*b* and 352*b*, and the second blade slots 361*b* and 362*b* as the moving member 321 of the aperture driver 320 moves further.

The second section 310*b*2 of the base guide slot 310*b*, and the second sections of the first blade slots 351*b* and 352*b* (351*b*2 and 352*b*2) are aligned in the medium aperture condition. Accordingly, the pair of first blades 351 and 352 may not be driven even though the driving pin 323 moves through the second sections 351*b*2 and 352*b*2 of the first blade slots 351*b* and 352*b*. Meanwhile, the second section 310*b*2 of the base guide slot 310*b* and the second sections 361*b*2 and 362*b*2 of the second blade slots 361*b* and 362*b* are not aligned. Therefore, when the driving pin 323 starts to move in the second sections 361*b*2 and 362*b*2 of the second blade slots 361*b* and 362*b*, the pair of second blades 361 and 362 start to rotate.

When the driving pin 323 moves in the second sections 361*b*2 and 362*b*2 of the second blade slots 361*b* and 362*b*, the pair of second blades 361 and 362 may be rotated to approach each other around the pivot pin 311. Thus, the pair of second-driven sections 3611 and 3621 of the second blades 361 and 362 may overlap each other in a larger region, and the pair of second shield sections 3612 and 3622 may meet each other to form the second-diameter aperture 360*a*. The second-diameter aperture 360*a* is formed of a circular opening, and the aperture module 300 may form a smaller-diameter aperture with a smaller diameter than the first-diameter aperture 350*a*.

Figure 11:
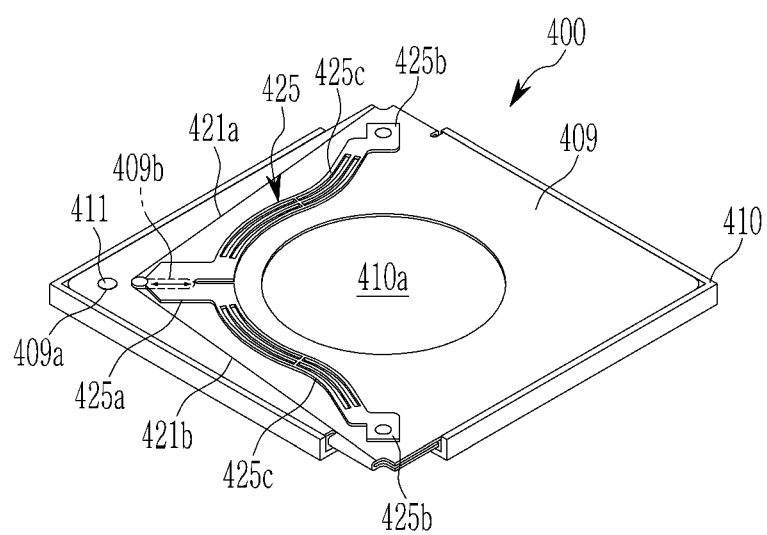
FIG. 11 is a perspective view of an aperture module according to another embodiment.

FIG. 11 is a perspective view of an aperture module according to another embodiment.

Referring to FIG. 11, an aperture module 400, according to the present embodiment, may include an aperture driver that uses shape memory alloy (SMA) wires 421*a* and 421*b*. The aperture module 400 includes a cover plate 409 coupled to an upper end of a base plate 410, and the aperture driver may include a driving pin 423 protruded to a top surface of the cover plate 409 and the SMA wires 421*a* and 421*b* connected to the driving pin 423.

The cover plate 409 may have a pivot pin hole 409*a* formed in a position corresponding to the pivot pin 411 of the base plate 410 in one corner region. In addition, the cover plate 409 may have a cover guide slot 409*b* that is spaced apart from the pivot pin hole 409*a* and extends straight toward the center of a central opening 410*a*. That is, the cover guide slot 409*b* may extend by a predetermined distance in a diagonal direction from one corner region of the cover plate 409. The SMA wires 421*a* and 421*b* may be driven to move the driving pin 423 along the cover guide slot 409*b* according to an electrical signal input. The cover plate 409 may be a reference plate for the present embodiment.

The aperture driver may include a restoration spring 425 supporting the driving pin 423 on the top surface of the cover plate 409. The restoration spring 425 has a plate spring structure and may be configured to apply a repulsive force to the driving pin 423 in a direction radially outward.

Specifically, the restoration spring 425 may have a structure in which a support end 425*a* and a fixed end 425*b* are connected by an elasticity support 425*c*. In this case, the support end 425*a* of the restoration spring 425 may be disposed to a pivot corner region where the pivot pin 411 is positioned to contact the driving pin 423. The fixed end 425*b* of the restoration spring 425 may be fixed to a fixed end corner region adjacent to the pivot corner region on the cover plate 409.

In addition, the fixed end 425*b* and the elasticity support 425*c* of the restoration spring 425 may be symmetrically connected to both sides of a pair of the support ends 425*a*. Thus, the pair of fixed ends 425*b* are fixed to the fixed end corner regions positioned on either side of the central opening 410*a*, and a pair of elasticity supports 425*c* may be disposed around the outside of the central opening 410*a*.

Meanwhile, when one end of the SMA wires 421*a* and 421*b* is connected to the driving pin 423, the other end may be fixed to the end of the fixed end corner region of the cover plate 409. In this case, one end of the pair of SMA wires 421*a* and 421*b* is connected together to the driving pin 423, and the other end of the pair of SMA wires 421a and 421b is fixed to both ends of the fixed end corner region, respectively. These SMA wires 421a and 421b are connected to a circuit board (not shown) and may receive an electrical signal required for operation.

As a result, the SMA wires 421a and 421b may be driven to move the driving pin 423 inward in the radial direction of the central opening 410a, and the restoration spring 425 may be driven to move the driving pin 423 outward in the radial direction of the central opening 410a.

Hereinafter, a configuration of the base plate 410, a first-stage blade unit 450, and a second-stage blade unit 460 of the aperture module 400, according to the present embodiment, will be described. The configuration of the base plate 410, the first-stage blade unit 450, and the second-stage blade unit 460, according to the present embodiment, is almost the same as the embodiment described with reference to FIG. 1 to FIG. 10 in the basic coupling relationship, shape, and operation process. However, as SMA wires 421a and 421b are applied to the aperture driver, there is a difference in the position and shape of the guide slot and blade slot and the movement path of the driving pin 423. Hereinafter, the differences will be further described in detail.

Figure 12:
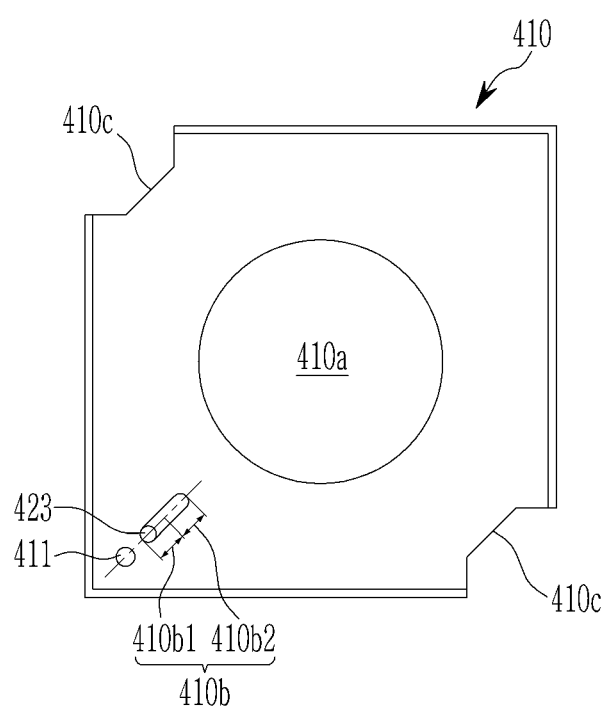
FIG. 12 is a perspective view of the base plate and the driving pin of the aperture module shown in FIG. 11.

FIG. 12 is a perspective view of the base plate and the driving pin of the aperture module shown in FIG. 11.

Referring to FIG. 12, the base plate 410 of the aperture module 400, according to the present embodiment, includes a pivot pin 411 and a base guide slot 410b in one corner region positioned on one side in a diagonal direction from the central opening 410a. The base guide slot 410b may extend a predetermined distance on a straight line toward the center of the central opening 410a so as to have a front tip closest to the pivot pin 411 and an end tip furthest from the pivot pin 411. In this case, a center line passing through a center of a width direction of the base guide slot 410b may be configured to pass through a center of the pivot pin 411, and may be divided into a first section 410b1, including the front tip and a second section 410b2 including the end tip.

Corner regions adjacent to both sides of the pivot corner region in which the pivot pin 411 is positioned in the base plate 410 may have a recess portion 410c with an end removed. The recess portion 410c may allow the end of the fixed end corner region to be exposed downward when the cover plate 409 is engaged. In the exposed region, a circuit board (not shown) to which the SMA wires 421a and 421b are connected may be disposed.

Figure 13:
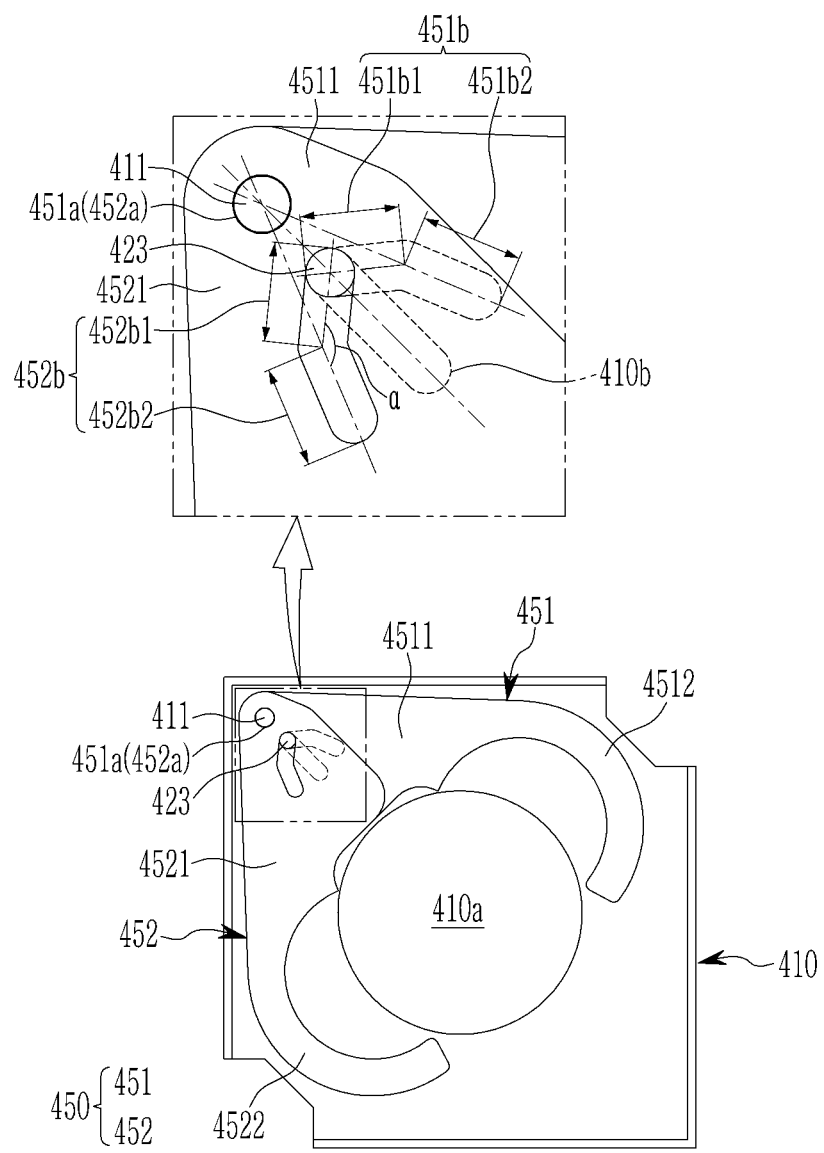
FIG. 13 is a top-plan view of a state in which the first-stage blade unit is assembled on the base plate of the aperture module shown in FIG. 11.

FIG. 13 is a top plan view of a state in which the first-stage blade unit is assembled on the base plate of the aperture module shown in FIG. 11.

Referring to FIG. 13, the first-stage blade unit 450 includes a pair of first blades 451 and 452, and the pair of first blades 451 and 452 may be seated on the base plate 410 while the pivot pin 411 is inserted into the pivot pin holes 451a and 452a. The pair of first blades 451 and 452 may include a pair of first driving sections 4511 and 4521 that overlap each other as the overlapping region changes according to the movement of the driving pin 423, and a pair of first shield sections 4512 and 4522 extending in a semi-annular shape therefrom, respectively.

The pair of first driving sections 4511 and 4521 may respectively include pivot pin holes 451a and 452a and first blade slots 451b and 452b. In the pair of first driving sections 4511 and 4521, the pivot pin holes 451as and 452a overlap each other, and the pair of first blade slots 451b and 452b may be linearly symmetrical with respect to the base guide slot 410b.

The first blade slots 451b and 452b are spaced apart from the pivot pin 411 and have a front tip closest to the pivot pin 411 and an end tip furthest from the pivot pin 411, and may be bent to form a curvature and extended at a first angle α. That is, the first blade slots 451b and 452b include the first section 451b1 and 452b1, including the front tip and the second sections 451b2 and 452b2, including the end tip, and the first sections 451b1 and 452b1 and the second sections 451b2 and 452b2 may be bent, forming a curvature, to form the first angle α.

In this case, a center line passing through a center of a width direction of the first blade slots 451b and 452b passes through the center pin 411, and a center line passing through a center of a width direction of the second sections 451b2 and 452b2 passes away from the center of the pivot pin 411. In addition, when the pair of first blades 451 and 452 are fully opened, the first blade slots 451b and 452b and the base guide slot 410b are disposed such that the respective center lines are not aligned with each other.

Figure 14:
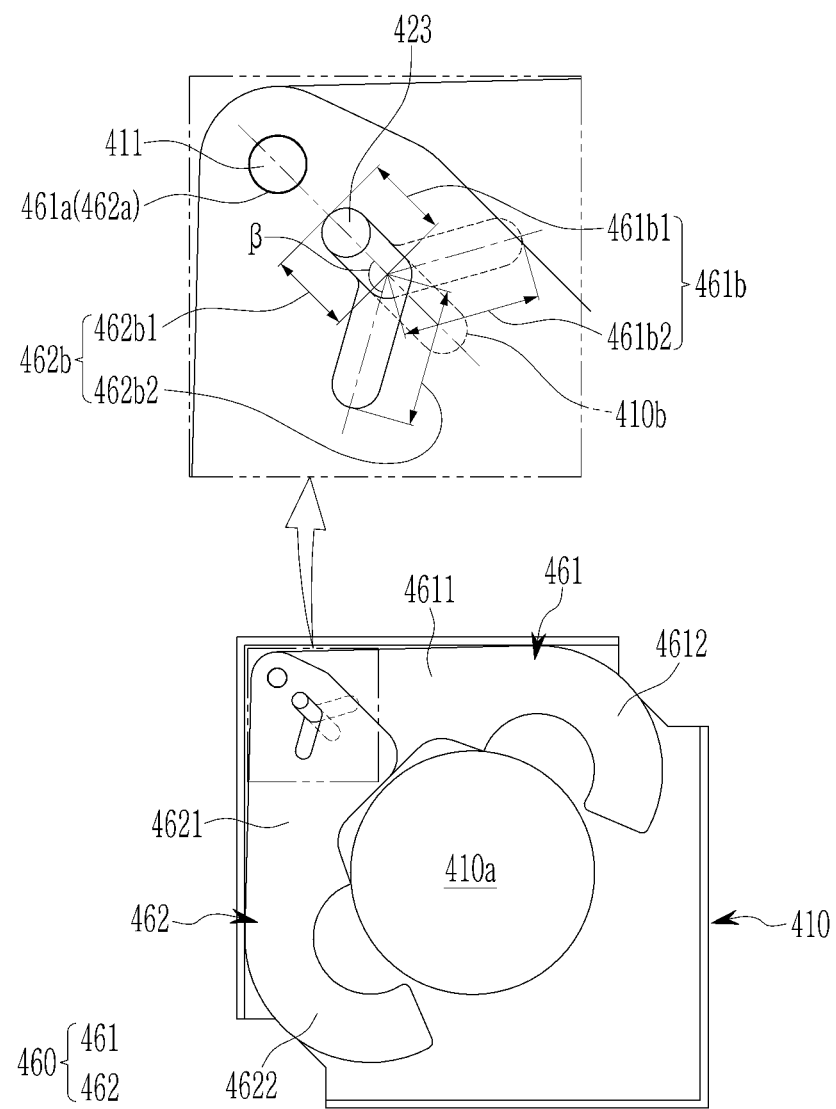
FIG. 14 is a top-plan view of a state in which the second-stage blade unit is assembled on the base plate of the aperture module shown in FIG. 11.

FIG. 14 is a top plan view of a state in which the second-stage blade unit is assembled on the base plate of the aperture module shown in FIG. 11.

Referring to FIG. 14, the second-stage blade unit 460 includes a pair of second blades 461 and 462, and the pair of second blades 461 and 462 may be seated on the base plate 410 while the pivot pin 411 is inserted in the pivot pin holes 461a and 462a. The pair of second blades 461 and 462 may include a pair of second driving sections 4611 and 4621 that overlap each other as the overlapping region changes according to the movement of the driving pin 423, and a pair of second shield sections 4612 and 4622 extending in a semi-annular shape therefrom, respectively.

The pair of second driving sections 4611 and 4621 may respectively include pivot pin holes 461a and 462a and second blade slots 461b and 462b. In the pair of second driving sections 4611 and 4621, the pivot pin holes 461a and 462a overlap each other, and the pair of second blade slots 461b and 462b may be linearly symmetrical with respect to the base guide slot 410b.

The second blade slots 461b and 462b are spaced apart from the pivot pin 411 and have a front tip closest to the pivot pin 411 and an end tip furthest from the pivot pin 411, and may be bent to form a curvature and extended at a second angle R. That is, the second blade slots 461b and 462b include first sections 461b1 and 462b1, including the front tip and the second sections 461b2 and 462b2s, including the end tip, and the first sections 461b1 and 462b1 and the second sections 461b2 and 462b2 may be bent, forming a curvature, to for the second angle β. In this case, the second angle β may be formed smaller than the angle α of the first blade slots 451b and 452b.

In this case, a center line passing through a center of a width direction of the first sections 461b1 and 462b1 of the second blade slots 461b and 462b passes away from the center of the pivot pin 411, and a center line passing through a center of a width direction of the second sections 461b2 and 462b2 passes through the center pin 411. In addition, when the pair of second blades 461 and 462 are fully opened, the second blade slots 461b and 462b and the first blade slots 451b and 452b are disposed such that the respective centerlines of the second blade slots 461b and 462b and the first blade slots 451b and 452b are not aligned with each other.

Figure 15:
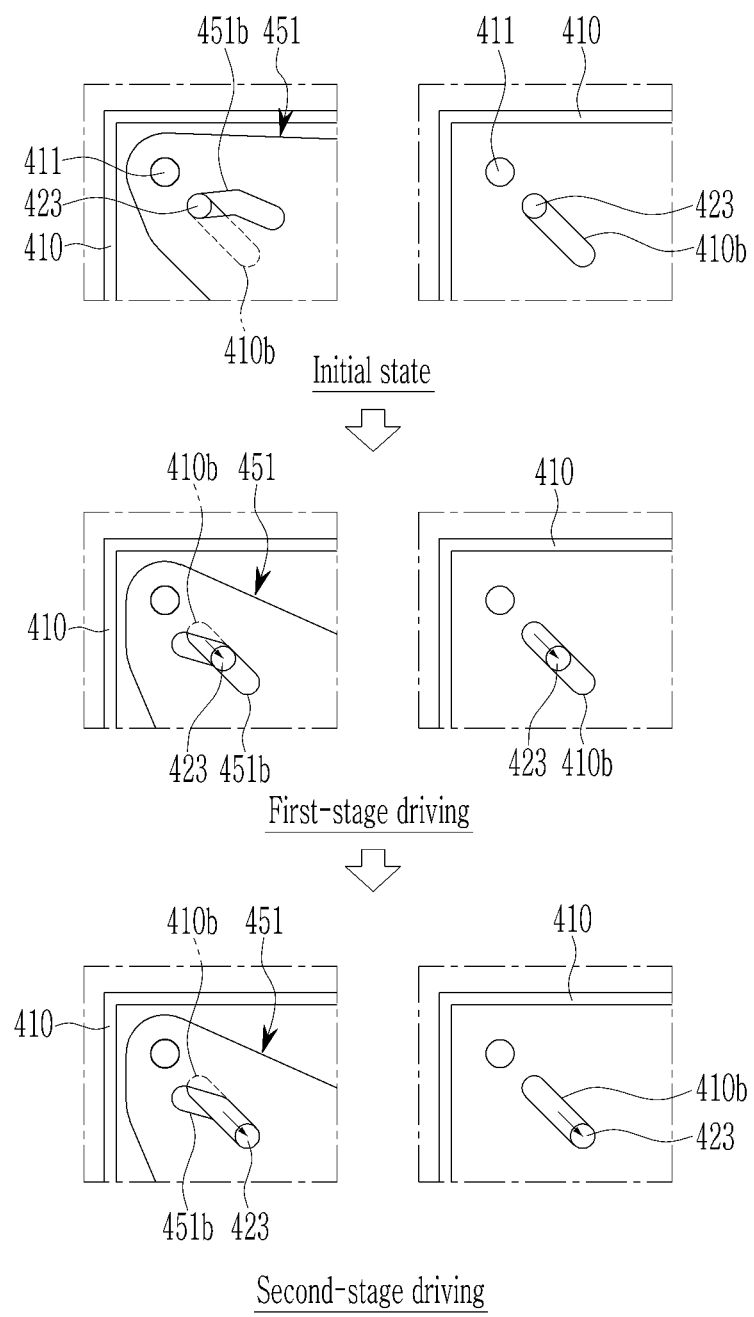
FIG. 15 is a top plan view that sequentially illustrates a driving process of the first-stage blade unit of the aperture module shown in FIG. 11.
Figure 16:
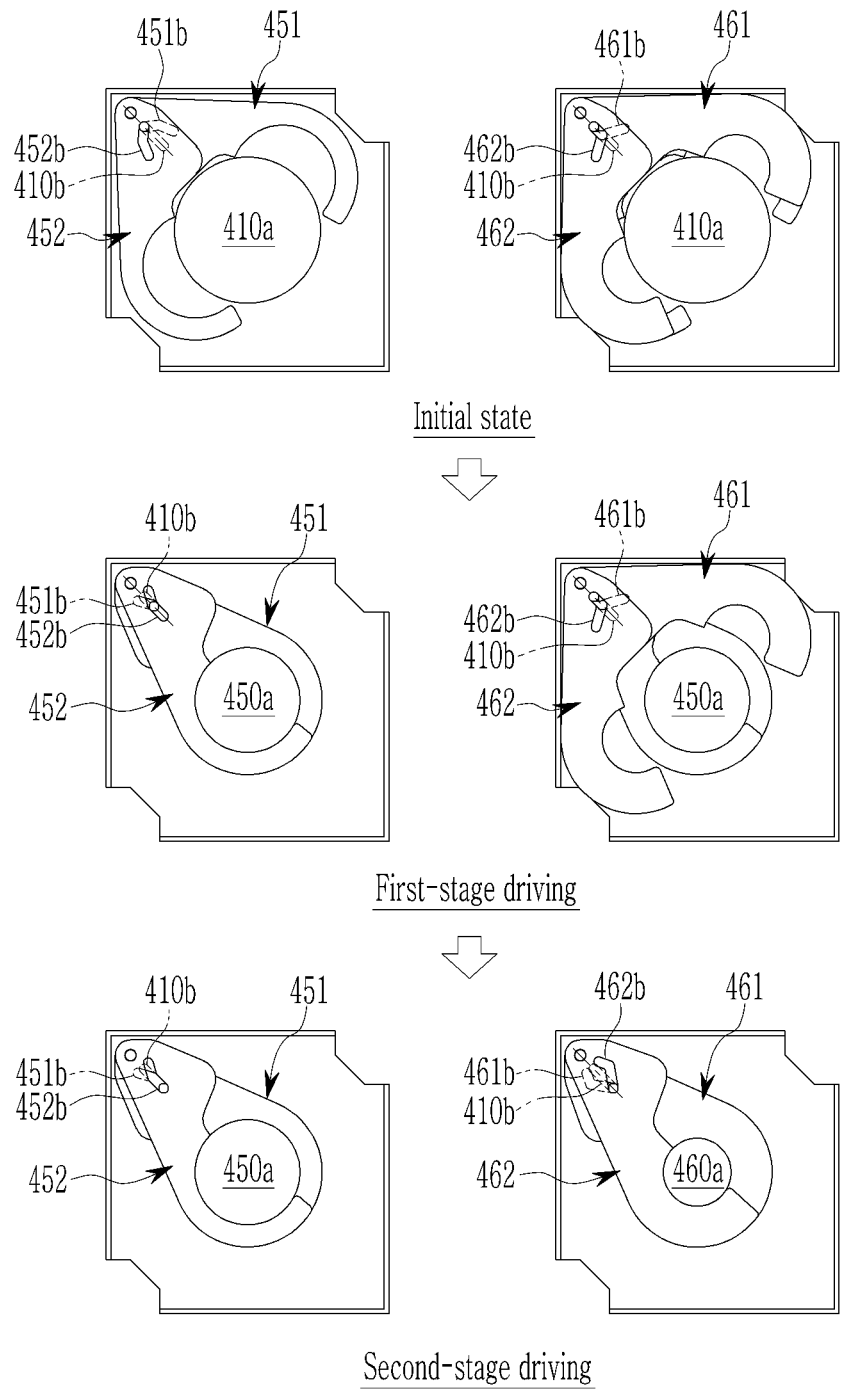
FIG. 16 is a top-plan view that sequentially illustrates a driving process of the aperture module shown in FIG. 11.

FIG. 15 is a top plan view that sequentially illustrates a driving process of the first-stage blade unit of the aperture module shown in FIG. 11, and FIG. 16 is a top plan view that sequentially illustrates a driving process of the aperture module shown in FIG. 11.

Referring to FIG. 15 and FIG. 16, in an initial state of the aperture module 400, that is, when an incidence hole is fully opened, the driving pin 423 is to be positioned at the front tip of the first blade slot 451b and 452b of the first blades 451 and 452 and the front tip of the second blade slots 461b and 462b of the second blades 461 and 462. In this case, the shape memory alloy wire 425 (refer to FIG. 11) may also be supported by the driving pin 423 in the initial state to which no electrical signal is applied.

In the initial state, the pair of first blades 451 and 452 and the pair of second blades 461 and 462 may be disposed such that there is no overlapping portion with the central opening 410a by spreading to both sides of the central opening 410a. As a result, the aperture module 400 may form a large-diameter aperture with an incidence hole as large as the central opening 410a.

Next, in the first-stage driving state, the driving pin 423 may move through each first section along the base guide slot 410b, the first blade slots 451b and 452b, and the second blade slots 461b and 462b. Such movement of the driving pin 423 can be realized as the SMA wire 425 contracts as electrical signal is applied. The SMA wire 425 may move the driving pin 423 in the radial direction of the central opening 410a.

In the initial state (large-diameter aperture state), the first section 410b1 (refer to FIG. 12) of the base guide slot 410b and the first sections 451b1 and 452b1 of the first blade slots 451b and 452b are not aligned, and the first section 410b1 of the base guide slot 410b and the first sections 461b1 and 462b1 of the second blade slots 461b and 462b are aligned. Accordingly, the driving pin 423 rotates the pair of first blades 451 and 452, but the pair of second blades 461 and 462 may maintain the initial position without rotation.

When the driving pin 423 moves through the first sections 451b1 and 452b1 of the first blade slots 451b and 452b, the pair of first blades 451 and 452 may meet to form a first-diameter aperture 450a with a smaller diameter than the central opening 410a.

Next, in the second-stage driving state, the driving pin 423 may move each second section along the base guide slot 410b, the first blade slots 451b and 452b, and the second blade slots 461b and 462b.

In the second-stage driving state, the second section 410b2 (refer to FIG. 12) of the base guide slot 410b and the second sections 451b2 and 452b2 of the first blade slots 451b and 452b are aligned, and the second section 410b2 of the base guide slot 410b and the second sections 461b2 and 462b2 of the second blade slots 461b and 462b are not aligned. Accordingly, the driving pin 423 rotates the pair of first blades 451 and 452 without driving the pair of second blades 461 and 462.

When the driving pin 423 moves in the second sections 461b2 and 462b2 of the second blade slots 461b and 462b, the pair of second blades 461, and 462 may meet each other to form a second-diameter aperture 460a with a smaller diameter than the first aperture 450a.

Figure 17:
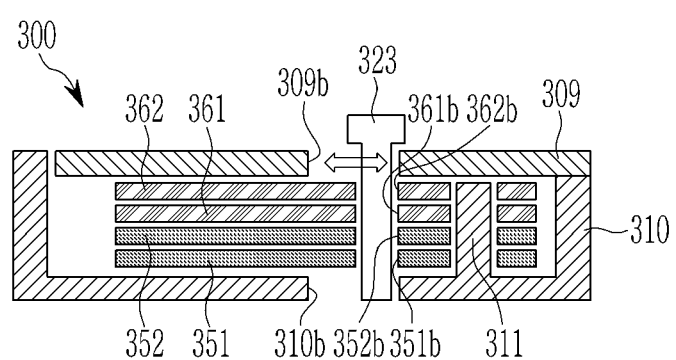
FIG. 17 to FIG. 19 are cross-sectional views that schematically illustrate a state in which a driving pin is coupled to a guide slot of an aperture module according to different embodiments.
Figure 18:
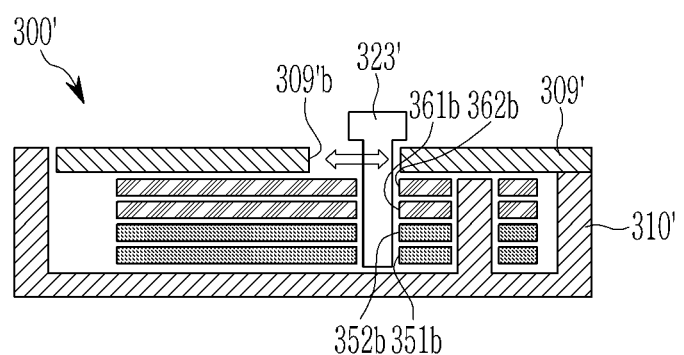
Figure 19:
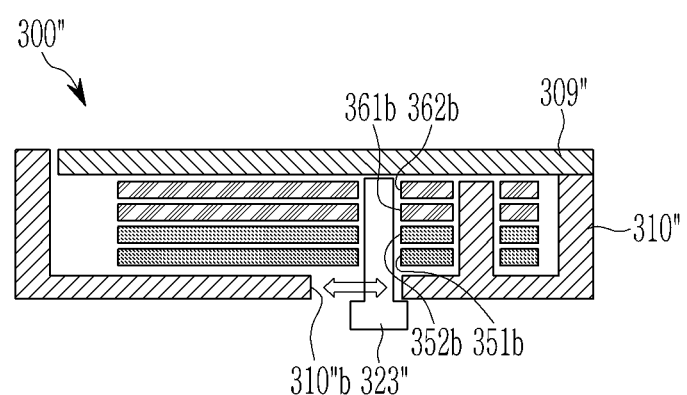

FIG. 17 to FIG. 19 are cross-sectional views that schematically illustrate a state in which a driving pin is coupled to a guide slot of an aperture module according to different embodiments.

Referring to FIG. 17, in the aperture module 300 of the above-described embodiment, the base plate 310 may have a base guide slot 310b and the cover plate 309 may have a cover guide slot 309b. The driving pin 323 is coupled to the first blade slots 351b and 352b and the second blade slots 361b and 362b, and may be formed to move along the base guide slot 310b and the cover guide slot 309b.

Referring to FIG. 18, in an aperture module 300' according to another embodiment, a base plate 310' does not include a base guide slot and a cover plate 309' may include a cover guide slot 309'b. In this case, the driving pin 323' is coupled to the first blade slots 351b and 352b and the second blade slots 361b and 362b, and may move along the cover guide slot 309'b.

Referring to FIG. 19, in an aperture module 300" according to another embodiment, a base plate 310" may include a base guide slot 310"b, and the cover plate 309" may not include a cover guide slot. In this case, the driving pin 323" is coupled to the first blade slots 351b and 352b and the second blade slots 361b and 362b, and may be formed to move along the base guide slot 310"b.

FIG. 20 to FIG. 23 are cross-sectional views that schematically illustrate pivot pins of aperture modules according to embodiments that are different from each other.

Figure 20:
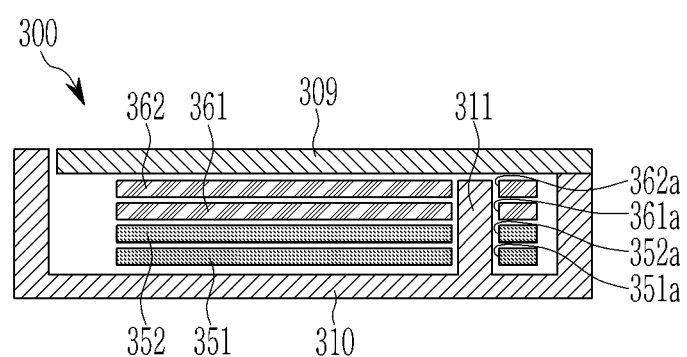
FIG. 20 to FIG. 23 are cross-sectional views that schematically illustrate pivot pins of aperture modules according to embodiments that are different from each other.

Referring to FIG. 20, the base plate 310 in the aperture module 300, according to the above-described embodiment, may include a pivot pin 311 protruding upward in one corner region. The pivot pin 311 may be coupled to the pivot pin holes 351a, 352a, 361a, and 362a of the first blades 351 and 352 and the second blades 361 and 362 to provide a fixed rotation axis.

Figure 21:
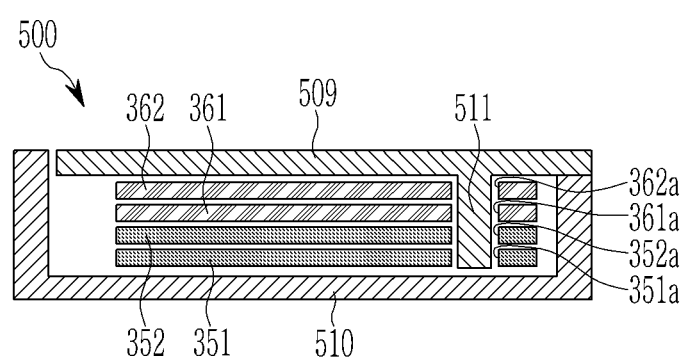

Referring to FIG. 21, in an aperture module 500, according to another embodiment, a cover plate 509 may include a pivot pin 511 protruded downward in one corner region. The pivot pin 511 may be coupled to pivot pin holes 351a, 352a, 361a, and 362a of first blades 351 and 352 and second blades 361 and 362 to provide a fixed rotation axis.

Figure 22:
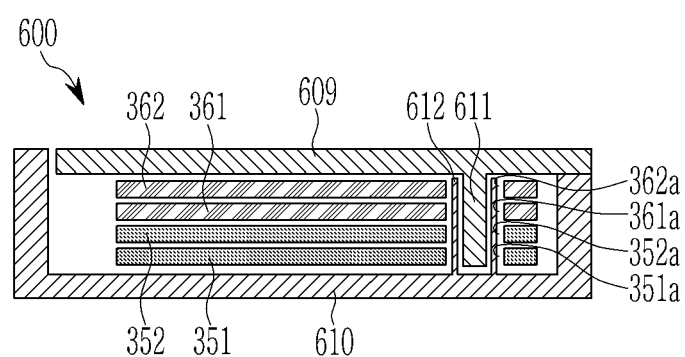

Referring to FIG. 22, in an aperture module 600, according to another embodiment, a base plate 610 may include a hollow cylindrical base pivot pin 612 protruded upward to one corner region, and a cover plate 609 may include a cover pivot pin 611 protruded downward to a corresponding one corner region. In this case, the cover pivot pin 611 may be inserted into an inner space of the base pivot pin 612. In addition, the base pivot pin 612 may be coupled to pivot pin holes 351a, 352a, 361a, and 362a of first blades 351 and 352 and second blades 361 and 362 to provide a fixed rotation axis.

Figure 23:
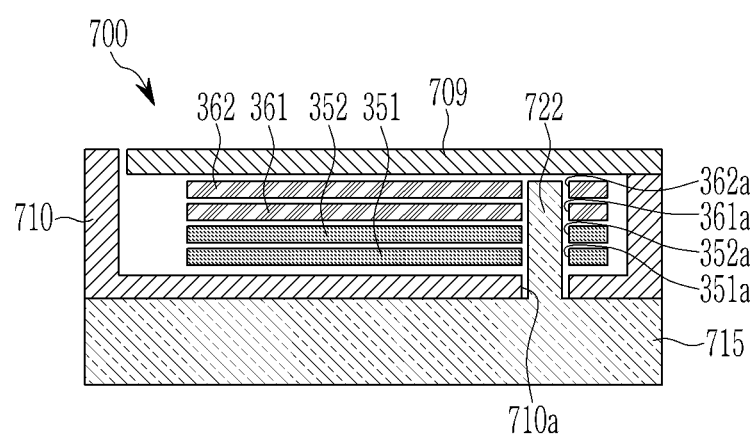

Referring to FIG. 23, in an aperture module 700, according to another embodiment, a separate base mold 715 is provided below a base plate 710 such that a mold pivot pin 722 may be protruded upward from the base mold 715. The base plate 710 may have a pivot pin hole 710a in a corresponding corner region, and the mold pivot pin 722 penetrates the pivot pin hole 710a of the base plate 710 and is coupled to pivot pin holes 351a, 352a, 361a, and 362a of the first blades 351 and 352 and the second blades 361 and 362, thereby providing a fixed rotation axis.

In the above, the embodiments of the aperture module having a blade unit of two stages have been described, but the configuration of an aperture module including a blade unit of three or more stages is also possible, which is also included within the scope of the present disclosure. Hereinafter, this will be described with reference to the drawing.

Figure 24:
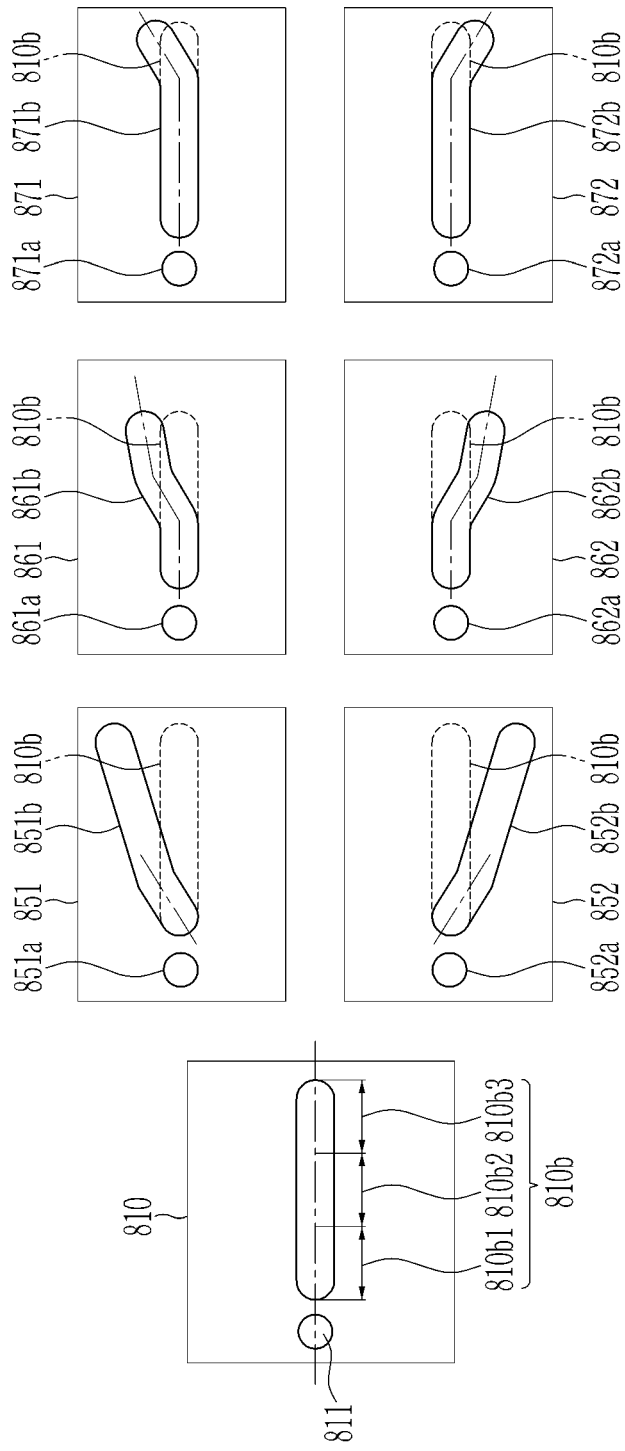
FIG. 24 is a top plan view illustrating a base plate of an aperture module and a guide slot of each stage blade according to another embodiment.

FIG. 24 is a top plan view illustrating a base plate of an aperture module and a guide slot of each stage blade according to another embodiment.

According to the present embodiment, the aperture module may include a three-stage blade unit. That is, a pair of first blades 851 and 852, a pair of second blades 861 and 862, and a pair of third blades 871 and 873 are sequentially stacked on a base plate 810 and may be coupled to a pivot pin 811. The base plate 810 has a central opening, the pair of first blades 851 and 852 may form a first-diameter aperture that is smaller than that of the central opening, the pair of second blades 861 and 862 may form a second-diameter aperture that is smaller than the first-diameter aperture, and the pair of third blades 871 and 872 may form a third-diameter aperture that is smaller than the second-diameter aperture.

Referring to FIG. 24, the base plate 810 may include a straight line-type base guide slot 810*b*. The base guide slot 810*b* may include a first section 810*b*1, a second section 810*b*2, and a third section 810*b*3 between a front tip closest to the pivot pin 811 and an end tip furthest from the pivot pin 811. It may be driven while the driving pin is guided along the base guide slot 810*b*.

First blade slots 851*b* and 852*b* may be formed in the pair of first blades 851 and 852, respectively. The pair of first blade slots 851*b* and 852*b* may be axisymmetric with respect to the base guide slot 810*b*. The first blade slots 851*b* and 852*b* may include a first section, a second section, and a third section between a front tip closest to the pivot pin 811 and an end tip furthest from the pivot pin 811. In this case, a center line passing through a center of a width direction of the first section of the first blade slots 851*b* and 852*b* passes away from the center of the pivot pin 811, and a center line passing through a center of a width direction of the second section and the third section passes through the center pin 811. Therefore, the driving pin may rotate the first blades 851 and 852 when passing the first section of the first blade slots 851*b* and 852*b*.

Second blade slots 861*b* and 862*b* may be formed in the pair of second blades 861 and 862, respectively. The pair of second blade slots 861*b* and 862*b* may be axisymmetric with respect to the base guide slot 810*b*. The second blade slots 861*b* and 862*b* may include a first section, a second section, and a third section between a front tip closest to the pivot pin 811 and an end tip furthest from the pivot pin 811. A center line passing through a center of a width direction of the second section of the second blade slots 861*b* and 862*b* passes away from the center of the pivot pin 811, and a center line passing through a center of a width direction of the first section and the third section passes through the center pin 811. Therefore, the driving pin may rotate the second blades 861 and 862 when passing the second section of the second blade slots 861*b* and 862*b*.

A pair of third blades 871 and 872 may include third blade slots 871*b* and 872*b*, respectively. The pair of third blade slots 871*b* and 872*b* may be axisymmetric with respect to the base guide slot 810*b*. The third blade slots 871*b* and 872*b* may include a first section, a second section, and a third section between a front tip closest to the pivot pin 811 and an end tip furthest from the pivot pin 811. A center line passing through a center of a width direction of the third section of the third blade slots 871*b* and 872*b* passes away from the center of the pivot pin 811, and a center line passing through a center of a width direction of the first section and the second section passes through the center pin 811. Therefore, the driving pin may rotate the third stage blades 871 and 872 when passing through the third section of the third blade slots 871*b* and 872*b*.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An aperture module comprising:
   a reference plate, comprising a protruded pivot pin, wherein the reference plate includes a central opening and a guide slot penetrating through one corner region;
   a first-stage blade unit comprising a pair of first blades each including a first blade slot overlapping a portion of the guide slot, wherein the pair of first blades forms a first-diameter aperture having a diameter smaller than a diameter of the central opening when pivoted about the pivot pin;
   a second-stage blade unit comprising a pair of second blades each including a second blade slot overlapping a portion of the guide slot, wherein the second-stage blade unit is disposed on a second planar surface different from a first planar surface of the first-stage blade unit, and the pair of second blades forms a second-diameter aperture having a diameter smaller than the diameter of the first-diameter aperture when pivoted about the pivot pin; and
   an aperture driver comprising a driving pin configured to insert into the guide slot, the first blade slot, and the second blade slot, and move along the guide slot,
   wherein a curvature of the first blade slot and a curvature of the second blade slot form different angles to have a plurality of divided sections.

2. The aperture module of claim 1, wherein
   each of the guide slot, the first blade slot, and the second blade slot has a front tip closest to the pivot pin and an end tip furthest from the pivot pin,
   the guide slot extends linearly from the front tip to the end tip, and a center line passing through a center of a width direction of the guide slot passes through a center of the pivot pin.

3. The aperture module of claim 2, wherein
   a pair of first blade slots in the pair of first blades are linearly symmetrical with respect to the guide slot, and
   a pair of second blade slots in the pair of second blades are linearly symmetrical to each other with respect to the guide slot.

4. The aperture module of claim 2, wherein
   the first blade slot includes a first section including the front tip and a second section including the end tip, and the second section forms a first angle with the first section, and
   a center line passing through a center of a width direction of the first section of the first blade slot extends away from the center of the pivot pin, and a center line passing through a center of a width direction of the second section of the first blade slot passes through the center of the pivot pin.

5. The aperture module of claim 4, wherein
   when the driving pin passes the first section of the first blade slot, the pair of first blades is configured to rotate about the pivot pin.

6. The aperture module of claim 2, wherein
the second blade slot includes a first section including the front tip and a second section including the end tip, and the second section forms an angle with the first section, and
a center line passing through a center of a width direction of the first section of the second blade slot passes through the center of the pivot pin, and a center line passing through a center of a width direction of the second section of the second blade slot extends away from the center of the pivot pin.

7. The aperture module of claim 6, wherein
when the driving pin passes the second section of the second blade slot, the pair of second blades is configured to rotate about the pivot pin.

8. The aperture module of claim 1, wherein
the pair of first blades comprise a pair of first driving sections, respectively, configured to overlap when varying an overlapped region based on a movement of the driving pin, and a pair of first shield sections that extend semi-annularly from the pair of first driving sections to form the first-diameter aperture,
the pair of second blades comprise a pair of second driving sections, respectively, configured to overlap when varying an overlapped region based on the movement of the driving pin, and a pair of second shield sections that extend semi-annularly from the pair of second driving sections to form the second-diameter aperture.

9. The aperture module of claim 1, further comprising a third-stage blade unit comprising a pair of third blades each including a third blade slot overlapping a portion of the guide slot, wherein the third-stage blade unit is disposed on a third planar surface different from the first and second planar surfaces, and the pair of third blades forms a third-diameter aperture having a diameter smaller than the diameter of the second-diameter aperture when pivoted about the pivot pin, and
a curvature of the third blade slot is different that the curvature of the first blade slot and the curvature of the second blade slot.

10. The aperture module of claim 9, wherein
when each of the first blade slot, the second blade slot, and the third blade slot is divided into a plurality of sections in a longitudinal direction,
center lines passing through centers of width directions of the first blade slot, the second blade slot, and the third blade slot respectively extend out of the center of the pivot pin in different sections.

11. The aperture module of claim 1, wherein
the reference plate further includes a base plate on which the first-stage blade unit and the second-stage blade unit are seated, and
the guide slot includes a base guide slot penetrating through one corner region of the base plate.

12. The aperture module of claim 1, wherein
the reference plate further includes a cover plate disposed to cover the first-stage blade unit and the second-stage blade unit, and
the guide slot includes a cover guide slot penetrating through one corner region of the cover plate.

13. The aperture module of claim 1, wherein
the aperture driver includes a moving member configured to linearly reciprocate to move the driving pin, and
the moving member includes an aperture driving magnet configured to face an aperture driving coil.

14. The aperture module of claim 13, wherein
the guide slot of the reference plate extends in a direction parallel to one edge of the reference plate.

15. The aperture module of claim 1, wherein
the aperture driver further includes a shape memory alloy (SMA) wire having one end connected to the driving pin to move the driving pin based on electrical signal input.

16. The aperture module of claim 15, wherein
the reference plate further includes a cover plate disposed to cover the first-stage blade unit and the second-stage blade unit,
the guide slot includes a cover guide slot penetrating through one corner region of the cover plate, and
the cover guide slot extends linearly from the one corner region to a center of the central opening in a diagonal direction.

17. The aperture module of claim 16, wherein
the aperture driver further comprises a restoration spring configured to support the driving pin and apply a repulsive force outward in a radial direction of the central opening.

18. A camera module comprising:
a housing having an inner space;
a lens driving module accommodated in the inner space of the housing and driven in an optical axis direction or a direction perpendicular to the optical axis direction; and
an aperture module, disposed in front of the lens driving module, configured to adjust a size of an incidence hole, the aperture module comprising:
 a reference plate, comprising a protruded pivot pin, wherein the reference plate includes a central opening and a guide slot penetrating through one corner region;
 a first-stage blade unit comprising a pair of first blades each including a first blade slot overlapping a portion of the guide slot, wherein the pair of first blades forms a first-diameter aperture having a diameter smaller than a diameter of the central opening when pivoted about the pivot pin;
 a second-stage blade unit comprising a pair of second blades each including a second blade slot overlapping a portion of the guide slot, wherein the second-stage blade unit is disposed on a second planar surface different from a first planar surface of the first-stage blade unit, and the pair of second blades forms a second-diameter aperture having a diameter smaller than the diameter of the first-diameter aperture when pivoted about the pivot pin; and
 an aperture driver comprising a driving pin configured to insert into the guide slot, the first blade slot, and the second blade slot, and move along the guide slot,
 wherein a curvature of the first blade slot and a curvature of the second blade slot form different angles to have a plurality of divided sections.

19. The camera module of claim 18, wherein
the aperture driver further comprises a moving member configured to linearly reciprocate to move the driving pin, and
the moving member includes an aperture driving magnet configured to face an aperture driving coil.

20. The camera module of claim 19, wherein
the aperture driving coil is fixed to one side wall of the housing.

21. An aperture module comprising:
a base plate, comprising a protruded pivot pin, an aperture, and a linear guide slot;

a first-stage blade unit comprising a pair of first blades each including a first blade slot overlapping a portion of the guide slot, wherein the pair of first blades forms a first-diameter aperture having a diameter different than a diameter of the aperture when pivoted about the pivot pin;

a second-stage blade unit comprising a pair of second blades each including a second blade slot overlapping a portion of the guide slot, wherein the second-stage blade unit is disposed on the first-stage blade unit, and the pair of second blades forms a second-diameter aperture having a diameter different than the diameter of the first-diameter aperture when pivoted about the pivot pin; and an aperture driver comprising a driving pin configured to insert into the guide slot, the first blade slot, and the second blade slot, and move along the guide slot, wherein a curvature of the first blade slot and a curvature of the second blade slot are axisymmetric with respect to the linear guide slot, and form different angles to have a plurality of divided sections.

22. The aperture module of claim 21, wherein the aperture driver includes a moving member configured to linearly reciprocate to move the driving pin.

23. The aperture module of claim 22, wherein the aperture driver further includes a shape memory alloy (SMA) wire having one end connected to the driving pin to move the driving pin based on electrical signal input.

* * * * *